United States Patent
Oguri et al.

(10) Patent No.: US 8,482,897 B2
(45) Date of Patent: Jul. 9, 2013

(54) AIRCRAFT ASSEMBLY AND METHOD FOR MANUFACTURING THE SAME

(75) Inventors: Kazuyuki Oguri, Nagoya (JP); Takahiro Sekigawa, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 461 days.

(21) Appl. No.: 12/525,177

(22) PCT Filed: May 14, 2008

(86) PCT No.: PCT/JP2008/058856
§ 371 (c)(1),
(2), (4) Date: Jul. 30, 2009

(87) PCT Pub. No.: WO2008/143092
PCT Pub. Date: Nov. 27, 2008

(65) Prior Publication Data
US 2010/0108804 A1    May 6, 2010

(30) Foreign Application Priority Data
May 21, 2007   (JP) .................................. 2007-134473

(51) Int. Cl.
*H05F 3/00*    (2006.01)
(52) U.S. Cl.
USPC .......................................................... 361/218
(58) Field of Classification Search
USPC .......................................................... 361/218
See application file for complete search history.

(56) References Cited

U.S. PATENT DOCUMENTS

| | | | |
|---|---|---|---|
| 2,326,455 A | 8/1943 | Gray | |
| 3,494,243 A | 2/1970 | Kleinhenn | |
| 3,618,444 A | 11/1971 | Kay et al. | |
| 3,755,713 A * | 8/1973 | Paszkowski | ................. 361/218 |
| 4,235,147 A | 11/1980 | Weidner, Jr. | |
| 4,316,690 A | 2/1982 | Voller | |
| 4,460,300 A | 7/1984 | Bettini et al. | |

(Continued)

FOREIGN PATENT DOCUMENTS

| | | |
|---|---|---|
| CN | 2354219 | 12/1999 |
| EP | 1772376 | 4/2007 |

(Continued)

OTHER PUBLICATIONS

International Search Report mailed Jun. 17, 2008 for International Application No. PCT/JP2008/058856.

(Continued)

*Primary Examiner* — Stephen W Jackson
(74) *Attorney, Agent, or Firm* — Wenderoth, Lind & Ponack, L.L.P.

(57) ABSTRACT

An aircraft assembly having improved durability and capable of providing good lightning protection is provided. Provided is an aircraft assembly (1) equipped with an outer panel (5) that is constructed using an outer-panel resin material reinforced with fiber as a main element; a structural member (7) that supports the outer panel (5) from the inside; and a fastener (3) that joins the outer panel (5) and the structural member (7), the aircraft assembly including an insulator layer (23) having insulating properties and disposed so as to cover at least the head (17) of the fastener (3); and a conductor layer (25) disposed so as to cover at least the insulator layer (23) and formed of a conductor-layer resin material containing copper powder having electrical conductivity.

13 Claims, 1 Drawing Sheet

U.S. PATENT DOCUMENTS

| | | | |
|---|---|---|---|
| 4,502,092 A | | 2/1985 | Bannick, Jr. et al. |
| 4,628,402 A | * | 12/1986 | Covey .......................... 361/218 |
| 4,630,168 A | | 12/1986 | Hunt |
| 4,681,497 A | | 7/1987 | Berecz |
| 4,755,904 A | | 7/1988 | Brick |
| 4,884,929 A | | 12/1989 | Smith et al. |
| 5,035,764 A | * | 7/1991 | Blake .......................... 156/327 |
| 5,845,872 A | | 12/1998 | Pridham et al. |
| 5,868,356 A | | 2/1999 | Giedris |
| 6,679,667 B2 | | 1/2004 | Brown et al. |
| 7,050,286 B2 | | 5/2006 | Pridham et al. |
| 7,883,050 B2 | | 2/2011 | Dufresne et al. |
| 2006/0141242 A1 | | 6/2006 | Keener et al. |
| 2006/0177284 A1 | | 8/2006 | Keener et al. |
| 2007/0081874 A1 | | 4/2007 | Kamino et al. |
| 2008/0137259 A1 | | 6/2008 | Heeter et al. |

FOREIGN PATENT DOCUMENTS

| | | |
|---|---|---|
| FR | 1 069 237 | 7/1954 |
| JP | 48-13892 | 5/1973 |
| JP | 3-18045 | 3/1991 |
| JP | 3-502357 | 5/1991 |
| JP | 9-144734 | 6/1997 |
| JP | 10-184633 | 7/1998 |
| JP | 2001-93336 | 4/2001 |
| JP | 2001-240953 | 9/2001 |
| JP | 2007-5442 | 1/2007 |
| JP | 2007-126119 | 5/2007 |

OTHER PUBLICATIONS

Chinese Office Action (and English translation thereof) issued May 25, 2012 in Chinese Application No. 200880108704.3.
Communication under Rule 71(3) EPC (Intention to Grant) issued Jun. 26, 2012 in European Patent Application No. 08833183.0.
Canadian Office Action issued Aug. 29, 2011 in Canadian Patent Application No. 2,700,615.
Supplementary European Search Report issued Sep. 13, 2011 in European Patent Application No. 08833183.0.
Russian Office Action issued Mar. 15, 2011 in Russian Patent Application No. 2010110673 w/a letter containing a concise statement of relevancy in the English language.
International Search Report issued Dec. 16, 2008 in International (PCT) Application No. PCT/JP2008/067230.
Japanese Office Action issued Nov. 6, 2012 in corresponding Japanese Application No. 2011-029237 (with English translation).
Japanese Office Action issued Nov. 6, 2012 in corresponding Japanese Application No. 2011-029238 (with English translation).
U.S. Office Action issued Dec. 24, 2012 in related U.S. Appl. No. 12/677,380.

* cited by examiner

AIRCRAFT ASSEMBLY AND METHOD FOR MANUFACTURING THE SAME

TECHNICAL FIELD

The present invention relates to an aircraft assembly and a method for manufacturing the same.

BACKGROUND ART

A lightweight, high-strength, and durable material is required for the material of the bodywork (outer panel) of an aircraft. Therefore, in recent years, resin materials (composite materials) reinforced with fiber have been increasingly used.

As such composite materials, for example, carbon-fiber reinforced plastics (CFRP) in which carbon fibers are hardened with an epoxy resin etc. and glass-fiber reinforced plastics (GFRP) in which glass fibers are hardened with an epoxy resin etc. are often used.

These composite materials have a problem in that resistance to a lightning strike is lower than that of metal. Furthermore, since fasteners for mounting an outer panel to an inner structural member are made of metal (for example, titanium alloy), there is a risk of a lightning strike passing through the fasteners to generate, for example, a spark therein.

Therefore, when a composite material is used for the outer panel, a structure considering lightning protection, in particular, a structure for preventing lightning from passing through the fasteners, is required.

Examples of such a lightning protection structure are described in Patent Document 1 and Patent Document 2.

The structure shown in Patent Document 1 has an insulating cap at the outer end of the head of the fastener. There are many proposals for preventing passage of lightning by devising the structure of the fastener in this way.

The structure shown in Patent Document 2 has a metal strap (electrically conductive layer) around the head of the fastener and an insulating layer on the head to release a lightning strike to an outer panel surface.

Patent Document 1: U.S. Pat. No. 4,630,168
Patent Document 2: U.S. Pat. No. 5,845,872

SUMMARY OF INVENTION

The structure shown in Patent Document 1 has a problem in that the structure of the fasteners is complicated, so that it takes much time to attach a large number of fasteners.

Furthermore, insulating caps are located on the surface of the outer panel. Therefore, to let a lightning stroke current due to a lightning strike flow along the surface of the outer panel, the lightning stroke current has to flow while detouring around these insulating caps, thus posing a problem in that the flow of the lightning stroke current is obstructed.

In the structure shown in Patent Document 2, the insulating layer is supported by a paint film, which causes insufficient mounting strength, thus posing a problem in durability. Moreover, there is a need to ensure insulation between the electrically conductive layer and the fasteners.

Patent Document 2 describes an electrically conductive layer (aluminum) that is provided so as to cover an insulating layer (glass fiber) covering the fasteners.

However, this has a problem in durability because it is difficult to firmly bond the glass fiber and the aluminum to the outer panel.

Furthermore, for example, the use of spraying increases the bonding strength; in this case, however, high heat due to the spraying is applied to the outer panel, which is problematic in that there is a risk of decreasing the strength of the outer panel itself.

The present invention is made in consideration of the above-described circumstances, and it is an object thereof to provide an aircraft assembly having improved durability and capable of providing good lightning protection, as well as a method for manufacturing the same.

The present invention adopts the following solutions to solve the above problems.

A first aspect of the present invention provides an aircraft assembly provided with an outer panel that is constructed using a first resin material reinforced with fiber as a main element, a structural member that supports the outer panel from the inside, and a fastener that joins the outer panel and the structural member, the aircraft assembly including an insulator layer having insulating properties and disposed so as to cover at least the head of the fastener; and a conductor layer disposed so as to cover at least the insulator layer and formed of a second resin material containing an electrically conductive material having electrical conductivity.

According to this aspect, since the outer panel and the conductor layer are each formed of a resin material, the mutual adhesiveness can be improved. This allows the outermost conductor layer to be firmly retained by the outer panel, thereby improving the durability of the lightning protection structure.

Furthermore, because the insulator layer is disposed between the conductor layer and the fastener, even if lightning strikes the conductor layer, the insulator layer can completely block a lightning stroke current that tries to flow toward the fastener to safely dissipate the lightning stroke current to the conductor layer. Since the conductor layer is provided on the outermost layer, the lightning stroke current can be made to flow smoothly.

The insulator layer may be disposed on the head of one fastener, or may be provided so as to cover also the periphery thereof, or alternatively, may be disposed so as to cover a plurality of the fasteners together. Covering the plurality of fasteners together further simplifies the execution.

It is preferable that the insulator layer be formed of an organic compound or a ceramic having insulating properties.

In the above aspect, it is preferable that the insulating layer be formed of a third resin material having insulating properties.

This improves the adhesiveness among the insulating layer, the outer panel, and the conductor layer, thereby further improving the durability of the lightning protection structure.

In this aspect, it is preferable that the second resin material and/or the third resin material be a thermosetting resin, be applied in a paste form, and be baked at a temperature at which it is hardened.

Since the second resin material and/or the third resin material is a thermosetting resin, is applied in a paste form, and is baked at a temperature at which it is hardened, high heat does not act on the first resin that constitutes the outer panel during execution. Therefore, the first resin is not degraded due to heat, thereby preventing degradation of the strength of the outer panel.

In the above structures, it is preferable that the second resin material and the third resin material be the same kind of resin Since the second resin material and the third resin material are the same kind of resin, as described above, they are easily made to have affinity to each other, so that the adhesiveness can be further improved.

By using the same kind of resin for the first resin material, the adhesiveness can be yet further improved.

A second aspect of the present invention provides a method for manufacturing an aircraft assembly provided with an outer panel that is constructed using a first resin material reinforced with fiber as a main element, a structural member that supports the outer panel from the inside, and a fastener that joins the outer panel and the structural member, the method for manufacturing an aircraft assembly including disposing an insulator layer so as to cover at least the head of the fastener; and disposing a conductor layer formed of a second resin material containing an electrically conductive material having electrical conductivity so as to cover at least the insulator layer.

According to this aspect, since the conductor layer made of the second resin is formed so as to cover the outer panel constituted of the first resin material, a mutually closely contacted lightning protection structure can be formed. This allows the outermost conductor layer to be firmly retained by the outer panel, thereby improving the durability of the lightning protection structure.

In this lightning protection structure, because the insulator layer is disposed between the conductor layer and the fastener, even if lightning strikes the conductor layer, the insulator layer can completely block a lightning stroke current that tries to flow toward the main body of the fastener to safely dissipate the lightning stroke current to the conductor layer. Since the conductor layer is provided on the outermost layer, the lightning stroke current can be made to flow smoothly.

The insulator layer may be disposed on the head of one fastener, or may be provided so as to cover also the periphery thereof, or alternatively, may be disposed so as to cover a plurality of the fasteners together. Covering the plurality of fasteners together further simplifies the execution.

In the above aspect, it is preferable that the insulating layer be formed of a third resin material having insulating properties.

This improves the adhesiveness among the insulating layer, the outer panel, and the conductor layer, thereby further improving the durability of the lightning protection structure.

In the above aspect, it is preferable that the second resin material and/or the third resin material be a thermosetting resin, be applied in a paste form, and be baked at a temperature at which it is hardened.

Since the second resin material and/or the third resin material is a thermosetting resin, is applied in a paste form, and is baked at a temperature at which it is hardened, high heat does not act on the first resin that constitutes the outer panel during execution. Therefore, the first resin is not degraded due to heat, thereby preventing degradation of the strength of the outer panel.

In the above structure, it is preferable that the second resin material and the third resin material be each applied in a paste form and be thereafter integrally baked.

This needs only one firing process. Therefore, the manufacturing time can be reduced by a corresponding time, and the manufacturing costs can be reduced.

According to the present invention, the outer panel, the insulator layer, and the conductor layer are each formed of a resin material. Therefore, the durability of the lightning protection structure can be improved.

Moreover, since the insulator layer is disposed between the conductor layer and the fastener, even if lightning strikes against the conductor layer, the lightning stroke current can be safely dissipated to the conductor layer.

EXPLANATION OF REFERENCE SIGNS

Figure 1:
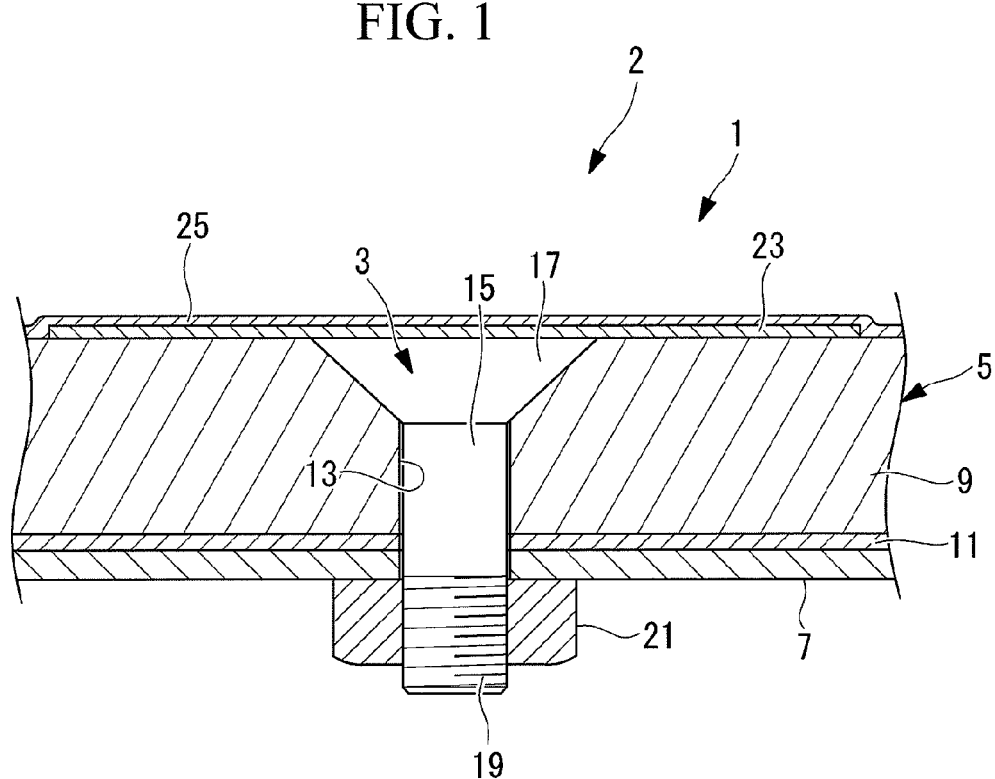
FIG. 1 is a fragmentary longitudinal sectional view showing an aircraft assembly according to a first embodiment of the present invention, which shows a state in which an outer panel and a structural member are joined with a fastener.

1: aircraft assembly
2: lightning protection structure
3: fastener
5: outer panel
7: structural member
9: main body
17: head
23: insulator layer
25: conductor layer

DETAILED DESCRIPTION OF THE INVENTION

Embodiments according to the present invention will be described hereinbelow with reference to the drawings.

First Embodiment

A first embodiment of an aircraft assembly, for example, a main wing or a fuselage, provided with a lightning protection structure according to the present invention will be described hereinbelow with reference to FIG. 1.

FIG. 1 is a longitudinal sectional view of an aircraft assembly 1, showing a state in which an outer panel 5 and a structural member 7 are joined with a fastener 3.

As shown in FIG. 1, the aircraft assembly (for example, a main wing assembly, a tail assembly, a fuselage assembly, etc.) 1 is assembled such that the outer panel 5 and the structural member (for example, a rib, a stringer, etc.) 7 are joined with the fasteners 3.

The main body 9 of the outer panel 5 is mainly formed of a resin material for the outer panel (first resin material) having electrical conductivity (an electrical conductivity of about 1/100 to 1/1,000 of that of aluminum).

The resin material for the outer panel is, for example, a carbon-fiber reinforced plastic (CFRP) in which carbon fibers are hardened with an epoxy resin.

An inner insulating layer 11 formed of a resin material having insulating properties (for example, a glass-fiber reinforced plastic (GFRP) in which glass fibers are hardened with an epoxy resin) is formed over the entire inner surface of the main body 9 (a surface located at the inside after assembly).

The structural member 7 is made of, for example, an aluminum alloy, titanium, or a CFRP, and is disposed at a predetermined position on the inner surface of the inner insulating layer 11 (a surface located at the inside after assembly).

A plurality of holes 13 that pass through the outer panel 5 and the structural member 7 in the plate thickness direction and that can receive the fasteners 3 are provided at predetermined positions in the structural component in which the structural member 7 is disposed on the back of the inner insulating layer 11.

The fasteners 3 are integrally formed of, for example, an alloy of titanium (Ti-6Al-4V: an annealed material), Inconel, etc.

The fasteners 3 are each provided with a columnar shaft (shank) 15 and a substantially frusto-conical head (flush head) 17 which is provided at one end of the shaft 15 and increases in diameter away from the shank 15. A male threaded portion 19 that is screwed into a female threaded portion of a collar (nut), described below, is formed at the opposite side from the head 17 of the shank 15.

The head 17 is formed such that the maximum diameter thereof is greater than or equal to, for example, about twice as large as the outside diameter of the shaft 15.

The fasteners 3 are inserted into the holes 13 provided in the outer panel 5 and the structural member 7. In this inserted state, the male threaded portions 19 project inward from the inner surface of the structural member 7, and the collars (nuts) 21 made of an alloy of, for example, titanium or Inconel are screwed thereon.

The outer end faces of the heads 17 are substantially flush with the outer surface of the main body 9, with the collars 21 screwed onto the male threaded portions 19.

In this state, a lightning protection structure 2 is formed at the outer surfaces of the outer panel 5 and the fasteners 3 (surfaces located outside after assembly).

The lightning protection structure 2 is formed of an insulator layer 23 and a conductor layer 25.

The insulator layer 23 is formed of a resin material for an insulating layer (third resin material).

The insulator layer 23 may be formed of, for example, an organic compound or a ceramic having insulating properties.

As an insulating resin material, a thermosetting resin having insulating properties, for example, a phenol resin, an epoxy resin, or a polyimide resin, is used. In this embodiment, a phenol resin is used.

The insulator layer 23 is formed to cover the heads 17 of the fasteners 3 and the periphery thereof.

The insulator layer 23 may be provided one for each of the fasteners 3, or alternatively, one for the plurality of fasteners 3.

The thickness of the insulator layer 23 is set to, for example, 1.0 mm, so as to have a sufficient dielectric strength even against a lightning-strike test voltage according to MIL-STD-1757A-Zone 1 (approximately 40 kV). In the case where a phenol resin is used as the insulator layer 23, it is provided with sufficient dielectric strength even if it is subjected to a MIL-STD-1757A-Zone 1 lightning-strike test voltage (approximately 40 kV) at a plate thickness of 1.0 mm because an estimated safe dielectric strength of the phenol resin is 50 kV/mm.

The use of a more-insulating resin material, for example, a polyimide resin, can decrease the thickness of the insulator layer, which can decrease swelling of the peripheries of the fasteners and can reduce the weight.

The conductor layer 25 is formed of a resin material for a conductor layer (second resin material) containing copper (electrically conductive material) powder.

As the resin material for the conductor layer, for example, a thermosetting resin, for example, a phenol resin or an epoxy resin, is used. In this embodiment, phenol resin is used.

In addition to copper, silver, gold, aluminum, etc. may be used as the electrically conductive material. The resistances of those materials at 20° C. (unit: μΩ·cm) are 1.70 for copper, 1.61 for silver, 2.20 for gold, and 2.74 for aluminum.

The conductor layer 25 covers the insulator layer 23 and is formed over almost the entire outer surface of the outer panel 5. The conductor layer 25 needs to cover the insulator layer 23; however, there is no need to provide it over almost the entire region of the outer surface of the outer panel 5.

The conductor layer 25 is constructed such that the portion covering the insulator layer 23 protrudes outwards relative to the other portion. However, since the thickness of the insulator layer 23 is set to about 0.2 mm, for example, and the surface of the conductor layer 25 is finally coated (painted), the surface of the outer panel 5 after the coating becomes substantially flush.

If required, the level difference can also be easily prevented by gradually decreasing the thickness of the ends of the conductor layer when processing the insulator layer by spraying etc.

The lightning protection structure 2 of the aircraft assembly 1 described above can be manufactured by the following procedure.

(1) The outer panel 5 and the structural member 7 are joined with the fasteners 3 to assemble the aircraft assembly 1.

(2) Phenol resin powder is mixed with a solvent to make a paste of the resin material for the insulating layer.

(3) The paste of the resin material for the insulating layer is applied to the heads 17 of the fasteners 3 and predetermined positions to cover the peripheries thereof on the outer panel 5.

(4) Copper powder and phenol resin powder are mixed with a solvent to make a paste of the resin material for the conductive layer.

(5) The paste of the resin material for the conductive layer covers the paste of the resin material for the insulating layer and is applied over substantially the entire region of the outer panel 15.

(6) The applied paste is baked at a temperature at which the phenol resin is hardened to thereby harden the phenol resin. The baking temperature is set to a temperature at which the aircraft assembly 1 is not adversely affected, for example, at 80° C. or lower, preferably, at approximately 60° C.

In this embodiment, after the paste of the resin material for the insulating layer and the paste of the resin material for the conductive layer have been applied, they are baked at the same time. As an alternative, for example, in the case where they should not be executed at the same time because of different baking conditions etc., the baking of the insulator layer 23 and the baking of the conductor layer 25 may be performed separately.

Baking the paste of the resin material for the insulating layer and the paste of the resin material for the conductive layer at the same time, as in this embodiment, can reduce the number of baking process steps by one, which can reduce the manufacturing time by a corresponding time, thereby reducing manufacturing costs.

In the thus-manufactured aircraft assembly 1, the main body 9 of the outer panel 5, the insulator layer 23, and the conductor layer 25 are each formed of a resin material, which can improve the mutual adhesiveness among them. This can improve the durability of the lightning protection structure 2.

Since both of the resin material for the insulating layer and the resin material for the conductive layer are phenol resins, they are easily made to have affinity to each other, so that the adhesiveness can be further improved.

Using epoxy resins as the resin material for the insulating layer and the resin material for the conductive layer can improve the adhesiveness among the main body 9 of the outer panel 5, the insulator layer 23, and the conductor layer 25, thereby further improving the adhesiveness.

The insulator layer 23 is disposed between the conductor layer 25 and the heads 17 of the fasteners 3. Therefore, even if lightning directly strikes the conductor layer 25, the insulator layer 23 can completely block a lightning stroke current that tries to flow toward the fasteners 3 to safely dissipate the lightning stroke current to the conductor layer 25.

Since the conductor layer 25 is continuously provided on the outermost layer, the lightning stroke current can be made to flow smoothly along the conductor layer 25.

Since the paste of the resin material for the insulating layer and the paste of the resin material for the conductive layer are baked at a temperature at which the aircraft assembly 1 is not adversely affected, for example, at 80° C. or lower, preferably, at approximately 60° C., high heat does not act on the outer-panel resin material that constitutes the main body 9 of the outer panel 5 during baking. Therefore, the outer-panel resin material is not degraded by heat, thereby preventing degradation of the strength of the outer panel 5.

Second Embodiment

Figure 2:
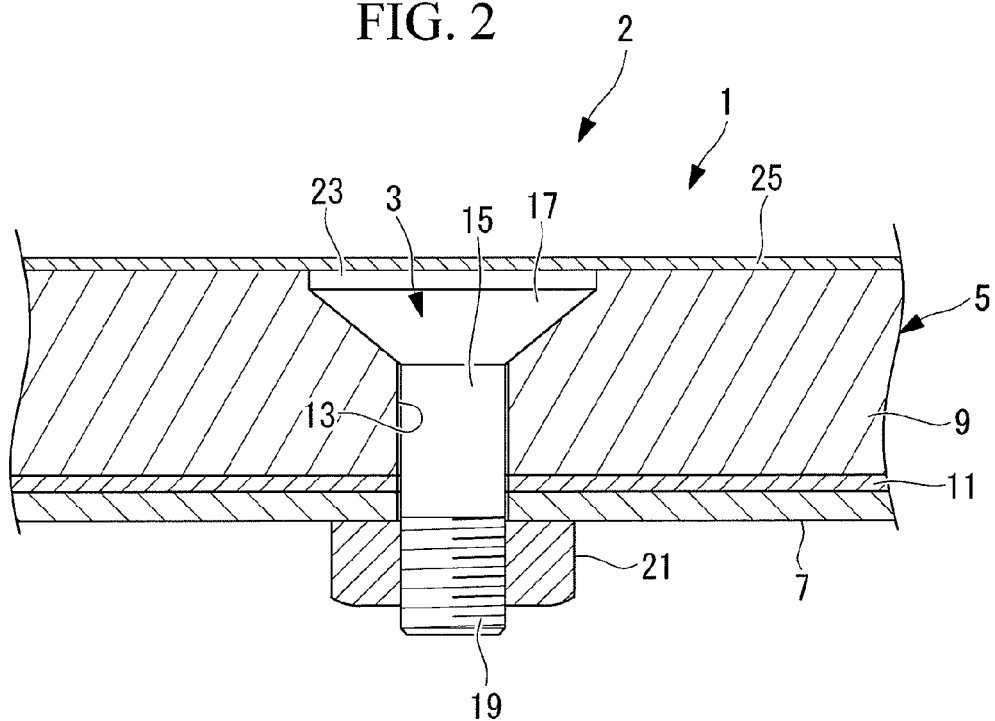
FIG. 2 is a fragmentary longitudinal sectional view showing an aircraft assembly according to a second embodiment of the present invention, which shows a state in which an outer panel and a structural member are joined with a fastener.

Next, an aircraft assembly 1 according to a second embodiment of the present invention will be described using FIG. 2.

This embodiment is the same as the first embodiment in basic structure and differs only in the structure of the insulator layer 23. Thus, only the difference will be mainly described, and duplicated descriptions of the same parts as those of the first embodiment described above will be omitted here.

The same components as in the first embodiment are given the same reference numerals.

In this embodiment, the insulator layer 23 is a disc-shaped member formed to have substantially the same outside diameter as that of the head 17 and is formed of, for example, a glass-fiber reinforced plastic (GFRP) in which glass fibers are hardened with an epoxy resin etc.

The insulator layer 23 is created in such a manner that glass fibers before hardening (in a prepreg state) are stacked, and are then impregnated with an epoxy resin and are thereafter hardened by application of heat.

The thickness of the insulator layer 23 is set to, for example, 1.0 mm, so as to have a sufficient dielectric strength even against a MIL-STD-1757A-Zone 1 lightning-strike test voltage (approximately 40 kV). In the case where a GFRP is used as the insulator layer 23, it is provided with sufficient dielectric strength even if it is subjected to a MIL-STD-1757A-Zone 1 lightning-strike test voltage (approximately 40 kV) at a plate thickness of 1.0 mm because an estimated safe dielectric strength of the GFRP is 40 kV/mm.

The insulator layer 23 may be formed of, for example, an organic compound or a ceramic having insulating properties.

The lightning protection structure 2 of the aircraft assembly 1 described above can be manufactured by the following procedure.

(1) The insulator layer 23 is mounted to the head 17 of the fastener 3. That is, a pretreatment for roughening the front surface of the head 17 of the fastener 3 is performed by projecting projectile particles (for example, hard particles of metal, ceramic, or glass with a mean particle diameter of 200 μm or below (more preferably, from 10 μm or greater to 100 μm or below)) onto one end face (front surface) of the head 17 of the fastener 3 (such a treatment is generally also referred to as "shotblasting"). The front surface of the head 17 can be roughened using sandpaper etc. instead of the shotblasting.

After an adhesive (an epoxy-based adhesive (for example, an epoxy-based adhesive EA9396 manufactured by Hysoi-Dexter)) has been applied onto one end face of the head 17, the insulator layer 23 is coated thereon, and the adhesive is hardened, so that the insulator layer 23 is fixed to the head 17.

The insulator layer 23 is mainly made of a resin-based material; however using a resin material having higher insulating properties, for example, a polyimide resin, can reduce the thickness of the insulator layer 23 bonded to the head 17 of the fastener 3, thereby allowing the depth of the fastener hole to be decreased.

(2) The outer panel 5, the structural member 7, and the insulator layer 23 are joined with the fasteners 3 to assemble the aircraft assembly 1.

(3) Copper powder and phenol resin powder are mixed with a solvent to make a paste of the resin material for the conductive layer.

(4) The paste of the resin material for the insulating layer is applied over substantially the entire region of the outer panel 5, including the fastener 3 portions.

(5) The applied paste is baked at a temperature at which the phenol resin is hardened to thereby harden the phenol resin.

In the thus-manufactured aircraft assembly 1, the main body 9 of the outer panel 5, the insulator layer 23, and the conductor layer 25 are each formed of a resin material, which can improve the mutual adhesiveness among them. This can improve the durability of the lightning protection structure 2.

Because the insulator layer 23 is disposed between the conductor layer 25 and the heads 17 of the fasteners 3, even if lightning strikes the conductor layer 25, the insulator layer 23 can completely block a lightning stroke current that tries to flow toward the fasteners 3 to safely dissipate the lightning stroke current to the conductor layer 25.

Since the conductor layer 25 is continuously provided on the outermost layer, the lightning stroke current can be made to flow smoothly along the conductor layer 25.

The present invention is not limited to the above-described embodiments; various modifications can be made as appropriate without departing from the spirit thereof.

The invention claimed is:

1. An aircraft assembly provided with an outer panel that is constructed using a first resin material reinforced with fiber as a main element, a structural member that supports the outer panel from an inside thereof, and a fastener that joins the outer panel and the structural member, the aircraft assembly comprising:
    an insulator layer having insulating properties and disposed so as to cover at least a head of the fastener; and
    a conductor layer disposed so as to cover at least the insulator layer and formed of a second resin material containing an electrically conductive material having electrical conductivity.

2. The aircraft assembly according to claim 1, wherein the insulating layer is formed of a third resin material having insulating properties.

3. The aircraft assembly according to claim 1, wherein the second resin material is a thermosetting resin, is applied in a paste form, and is baked at a temperature at which it is hardened.

4. The aircraft assembly according to claim 2, wherein the second resin material and the third resin material are the same kind of resin.

5. A method for manufacturing an aircraft assembly provided with an outer panel that is constructed using a first resin material reinforced with fiber as a main element, a structural member that supports the outer panel from an inside thereof, and a fastener that joins the outer panel and the structural member, the method for manufacturing an aircraft assembly comprising:
    disposing an insulator layer having insulating properties so as to cover at least a head of the fastener; and
    disposing a conductor layer formed of a second resin material containing an electrically conductive material having electrical conductivity so as to cover at least the insulator layer.

6. The method for manufacturing the aircraft assembly according to claim 5, wherein the insulating layer is formed of a third resin material having insulating properties.

7. The method for manufacturing the aircraft assembly according to claim 5, wherein the second resin material is a thermosetting resin, is applied in a paste form, and is baked at a temperature at which it is hardened.

8. The aircraft assembly according to claim 2, wherein the second resin material is a thermosetting resin, and is baked at a temperature at which it is hardened.

9. The aircraft assembly according to claim 8, wherein the second resin material and the third resin material are the same kind of resin.

10. The method for manufacturing the aircraft assembly according to claim 6, wherein the second resin material is a thermosetting resin, and is baked at a temperature at which it is hardened.

11. The method for manufacturing the aircraft assembly according to claim 10, wherein the second resin material and the third resin material are individually applied in a paste form and are thereafter integrally baked.

12. The aircraft assembly according to Claim 2, wherein the third resin material is a thermosetting resin, is applied in a paste form, and is baked at a temperature at which it is hardened.

13. The method for manufacturing the aircraft assembly according to Claim 6, wherein the third resin material is a thermosetting resin, is applied in a paste form, and is baked at a temperature at which it is hardened.

\* \* \* \* \*